E. NOVAK.
HOG CRATE AND HOLDER.
APPLICATION FILED JAN. 31, 1922.
1,436,897.
Patented Nov. 28, 1922.
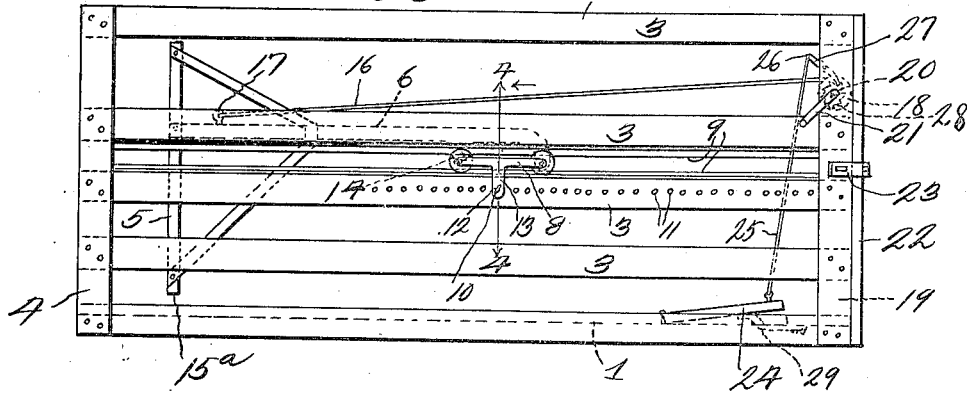
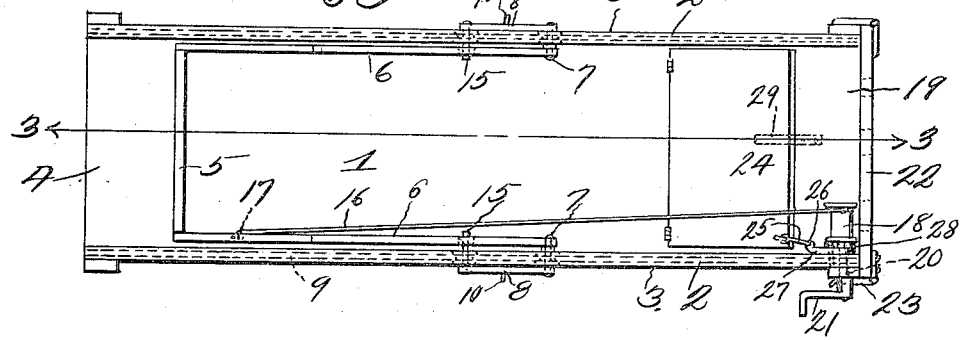
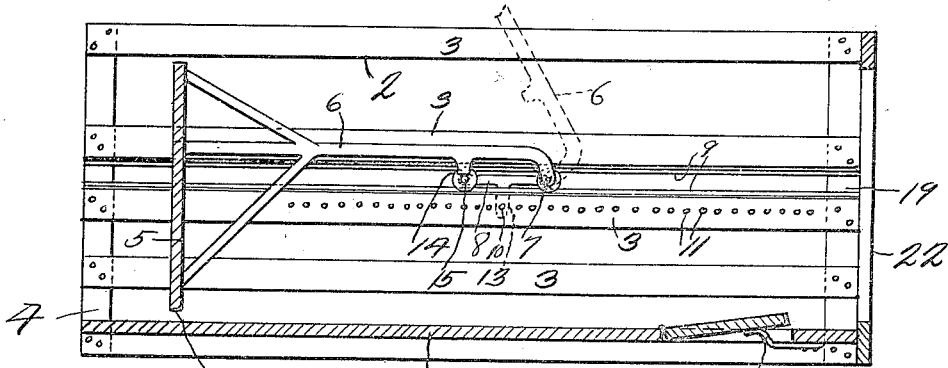
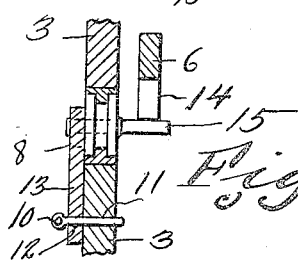
Inventor
Edward Novak
By Philip A. H. Serrell
His Attorney Patented Nov. 28, 1922.

1,436,897

UNITED STATES PATENT OFFICE.

EDWARD NOVAK, OF CLARKS, NEBRASKA.

HOG CRATE AND HOLDER.

Application filed January 31, 1922. Serial No. 532,942.

*To all whom it may concern:*

Be it known that I, EDWARD NOVAK, a citizen of the United States, residing at Clarks, in the county of Merrick and State of Nebraska, have invented certain new and useful Improvements in Hog Crates and Holders, of which the following is a specification, reference being had therein to the accompanying drawings.

The invention relates to animal restraining devices and has for its object to provide a device of this character particularly adapted for holding hogs so that they can be provided with rings or the like.

A further object is to provide a hog receiving crate comprising a substantially rectangular shaped casing, one end of said casing being opened and normally closed by vertically movable pivoted closure adapted to be closed after the animal enters the crate and controlled by a cable, the other end of the crate being provided with a hinged closure, which may be opened for allowing escape of the animal after applying a ring to the snout thereof.

A further object is to provide travelers to which the arms carrying the pivoted closure are pivoted, said travelers being provided with means whereby they may be held in various positions and with stops for limiting the downward movement of the arms.

With the above and other objects in view the invention resides in the combination and arrangement of parts as hereiafter set forth, shown in the drawings, described and claimed, it being understood that changes in the precise embodiment of the invention may be made within the scope of what is claimed without departing from the spirit of the invention.

In the drawings:—

Figure 1 is a side elevation of the hog crate.

Figure 2 is a top plan view of the crate.

Figure 3 is a vertical longitudinal sectional view through the crate taken on line 3—3 of Figure 2.

Figure 4 is a detail sectional view taken on line 4—4 of Figure 3.

Referring to the drawings, the numeral 1 designates the bottom of the crate and 2 the sides thereof which are formed from spaced horizontally disposed bars 3. The end 4 of the crate is opened and hogs enter at this end when the closure 5 is in raised position as shown in dotted lines in Figure 3, at which time the arms 6 which carry the closure 5 extend upwardly. The arms 6 are pivotally connected at 7 to travelers 8, which travelers are mounted on tracks 9 and are adapted to be moved to various positions and held against movement by means of pins 10 which extend through anyone of the apertures 11 in one of the bars 3 and through the apertures 12 in depending lugs 13 carried by the travelers 8. It will be seen that the travelers 8 may be adjusted to various positions according to the size and kind of animals being restrained. The arms 6 are limited in their downward movement by means of lugs 14 which engage lugs 15 carried by the travelers 8 and the lower edge 15$^a$ is held spaced from the bottom 1 thereby allowing the device to be easily moved longitudinally in the crate without interference of dragging over the bottom 1.

The closure 5 is moved upwardly by means of a cable 16 which is connected at 17 to one of the arms 6 and passes over a drum 18 adjacent the exit end 19 of the crate, said drum being mounted on a shaft 20, which is rotated by means of an operating crank 21. It will be seen that when the cable 16 is wound on the drum 18 that the closure 5 will be moved upwardly, and that after the same is raised, and while the exit closure 22 is closed as shown, a hog or other animal may be driven into the crate, after which the closure 5 is lowered and if so desired the pins 10 may be removed, the cable 16 wound on the drum 18 thereby causing the closure 5 to move inwardly for crowding the animal into the exit end 19 of the device where it can be easily and quickly supplied with a ring if a hog, and by a single operator. After the animal has been supplied with a ring, the closure 22 may be opened by releasing the hasp 23 which will allow the animal to leave the crate.

As the animal moves toward the exit end 19 of the crate it steps on the hinged section 24 of the bottom 1 which imparts a pull on the cable 25. The cable 25 is connected at 26 to a pivoted dog 27 which dog engages a ratchet 28 carried by shaft 20. The pivoted dog 27 when out of engagement with the ratchet 28 allows the cable 16 to unwind from the drum 18 and the closure 5 to drop by gravity. The hinged member 24 is held upwardly by the spring 29 thereby relieving weight of the hinged member 24 from the cable 25.

From the above it will be seen that a hog or animal restraining device is provided which is simple in construction, and one which may be easily and cheaply constructed and operated by a single operator. Also means is provided whereby the animal upon entering the device while the closure 5 is raised, will trip the mechanism whereby said closure will be lowered behind the animal.

The invention having been set forth what is claimed as new and useful is:—

1. An animal restraining device comprising an elongated receptacle having its ends open thereby forming an entrance and an exit, a closure for said exit, a closure for said entrance, said closure being vertically disposed and spaced from the bottom of the receptacle, pivoted arms caried by said last named closure, said pivoted arms being pivoted to longitudinally movable travelers carried by the sides of the receptacle, stops carried by said travelers for limiting the downward movement of the arms, means whereby said travelers may be held in various longitudinal positions, and cable means for controlling the pivoted arms and the closure.

2. An animal restraining device comprising an elongated receptacle having an entrance passage and an exit passage, a closure for the exit passage, travelers longitudinally movable on guides caried by the sides of the receptacle, arms pivoted to said travelers, said arms extending towards the entrance passage, stop lugs carried by the travelers in the path of the arms and forming means for limiting the downwardly movement thereof, an entrance closure carried by said arms, an apertured lug carried by each traveler and adapted to register with apertures in the sides of the receptacle and receive a securing pin, and cable means for controlling the entrance closure in such a manner that it may be raised or lowered as desired.

In testimony whereof I hereunto affix my signature.

EDWARD NOVAK.